(12) United States Patent
Lo et al.

(10) Patent No.: US 9,159,040 B2
(45) Date of Patent: *Oct. 13, 2015

(54) ACCESSING A ERP APPLICATION OVER THE INTERNET USING STRONGLY TYPED DECLARATIVE LANGUAGE FILES

(75) Inventors: Frederick Lo, Richmond (CA); David B. Orchard, Vancouver (CA); Arvind Viswanathan, Vancouver (CA); Jiri George Vodarek, North Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/254,771

(22) Filed: Oct. 20, 2008

(65) Prior Publication Data

US 2009/0064105 A1  Mar. 5, 2009

Related U.S. Application Data

(62) Division of application No. 10/719,461, filed on Nov. 21, 2003, now Pat. No. 7,444,643, which is a division of application No. 09/483,069, filed on Jan. 14, 2000, now Pat. No. 6,854,120.

(51) Int. Cl.
*G06F 9/46* (2006.01)
*G06F 9/00* (2006.01)
*G06F 17/30* (2006.01)
*G06Q 10/06* (2012.01)

(52) U.S. Cl.
CPC ..................... *G06Q 10/06* (2013.01)

(58) Field of Classification Search
CPC ....................................... G06Q 10/06
See application file for complete search history.

(56) References Cited

U.S. PATENT DOCUMENTS 6,125,391 A * 9/2000 Meltzer et al. ................ 709/223
6,738,975 B1 * 5/2004 Yee et al. ...................... 719/310

OTHER PUBLICATIONS

Fellner, K.J. Turowski, K., "Component Framework Supporting Inter-company Cooperation," Enterprise Distributed Object Computing Conference, 1999. EDOC '99. Proceedings. Third International Date: Sep. 27-30, 1999, pp. 164-171.*

* cited by examiner

*Primary Examiner* — H S Sough
*Assistant Examiner* — Kimberly Jordan
(74) *Attorney, Agent, or Firm* — Steven M. Greenberg, Esq.; CRGO Law (57) ABSTRACT

A method of converting ERP data in a database managed by an ERP application and accessed through an ERP API and ERP Message Agent API (MAAPI) to strongly typed data in Java objects includes steps of reading, parsing, creating, and populating. A XML file containing the definition of the Java objects and their attributes of HyperText Markup Language (HTML) statements which specifies presentation format is read. Each of the declarations and HTML statements are parsed to identify definitions of objects and their attributes. The respective objects are created with their attributes. The objects are populated with data from the ERP data.

8 Claims, 10 Drawing Sheets

STUDENT COURSE LIST

| 51 FIELD | | |
|---|---|---|
| | | JOHN SMITH |

52 SCROLL LEVEL 1

| | 55 FIELD 1 | 56 FIELD 2 |
|---|---|---|
| 53 ROW 1 | 57 MATH | 100 |
| 54 ROW 2 | 58 ENGLISH | 101 |

WEEKLY TYPED

FIG. 7

STRONGLY TYPED

FIG. 8

FIG. 9
DEFINING A SUB-GRAPH OF DATA OBJECTS

ACCESSING A ERP APPLICATION OVER THE INTERNET USING STRONGLY TYPED DECLARATIVE LANGUAGE FILES

CROSS-REFERENCE TO RELATED APPLICATIONS

This application is a Divisional of U.S. application Ser. No. 10/719,461, filed Nov. 21, 2003, now U.S. Pat. No. 7,444,643, entitled "ACCESSING A ERP APPLICATION OVER THE INTERNET USING STRONGLY TYPED DECLARATIVE LANGUAGE FILES," which is a Divisional of U.S. application Ser. No. 09/483,069, filed Jan. 14, 2000, now U.S. Pat. No. 6,854,120, entitled "ACCESSING A ERP APPLICATION OVER THE INTERNET USING STRONGLY TYPED DECLARATIVE LANGUAGE FILES," both of which are incorporated herein by reference in their entirety.

BACKGROUND OF THE INVENTION

1. Field of the Invention

This invention relates in general to enterprise resource planning systems performed by computers, and in particular, to a method and apparatus for accessing an enterprise resource planning application over the Internet using Java.

2. Description of Related Art

With the fast growing popularity of the Internet and the World Wide Web (also known as "WWW" or the "Web"), there is also a fast growing demand for Web access to Enterprise Resource Planning (ERP). However, it is especially difficult to use ERP software with the Web. One of the problems with using ERP software on the Web is the lack of correspondence between the protocols used to communicate in the Web with the protocols used to communicate with ERP software.

For example, the Web operates using the HyperText Transfer Protocol (HTTP), the eXtensible Markup Language (XML), the eXtensible Style Language (XSL) and the HyperText Markup Language (HTML). The use of this protocol and languages result in the communication and display of graphical information that incorporates hyperlinks. Hyperlinks are network addresses that are embedded in a word, phrase, icon or picture that are activated when the user selects a highlighted item displayed in the graphical information.

HTTP is the protocol used by Web clients and Web servers to communicate between themselves using these hyperlinks. HTML is the language used by Web servers to create and connect together documents that contain these hyperlinks. The HTML syntax and commands are specified by the web browsers, and cannot be extended by users.

XML and XSL are anticipated to be the next generation of web languages. XML is the language used by Web servers to create and connect together documents that contain user defined structures. XSL is the language used by web browsers to convert XML documents into HTML for the purposes of display. The validity of an XML document is defined by a Document Type Definition (DTD), which an XML parser uses to ensure that an XML document is valid.

Web servers are extensible via a number of APIs. The Common Gateway Interface (CGI) is a standard interface for executing programs external to the web server. The Java language is a programming language and environment defined by Sun Microsystems. Java Servlets are a widely available interface for executing Java programs within the web server. Java Server Pages (JSP) is a web page interface for specifying Java commands that are to be executed in the web server. The Visual Basic Script (VB Script) language is a programming language defined by Microsoft. The Active Server Pages (ASP) interface is a web page interface specified by Microsoft for specifying VB Script commands that are to be executed in the web server.

In contrast, most ERP software provides an application programming interface (API) for accessing ERP functionality from external programs. Each vendor of an external program may have its own implementation of the API, for example, Peoplesoft has an API, called the Message Agent API.

Thus, there is a need in the art for methods of accessing Enterprise Resource Planning software across the Internet network, and especially via the World Wide Web. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method and apparatus for executing pre-defined API calls in an ERP system via the Internet. In accordance with the present invention, Web users can request information from ERP software via HTML input forms, which request is then used to create a sequence of ERP API calls for execution by the ERP software. The results output by the ERP software are themselves transformed into HTML or XML/XSL format for presentation to the Web user. The specification of the ERP interface is done through the specification of ERP data definition.

One aspect of the invention provides a method for executing ERP application requests in a computer-implemented ERP data processing system via a network, comprising the steps of:

(a) transmitting a HyperText Markup Language (HTML) input form to a browser executed by a client computer in the network for display on a monitor attached thereto;

(b) receiving a HyperText Transfer Protocol (HTTP) request from the browser to access the ERP System, wherein the request optionally includes data entered by the user into an HTML input form;

(c) transferring any data entered by the user into the HTML input form and any data stored in the requested HTML page into the ERP application API;

(d) transferring control to the ERP application for execution;

(e) receiving output data from the ERP application in response to the transmitted data and request;

(f) merging the output data from the ERP application into a strongly typed Java object;

(g) transforming the strongly typed Java objects into a transmittable format, such as XML or HTML, and (h) transmitting the HTML or XML object to the browser for display on the monitor attached to the client computer.

Preferably the merging step comprises the step of merging the output data from the ERP application into a strongly typed object form using an ERP Web Gateway, wherein the strongly typed object form comprises strongly typed Java objects.

In another aspect the HTML input form, dynamic ERP Application data access, Java objects definitions and HTML report form are stored in form of XML files; wherein the XML file strongly couples the data in the ERP Application to the Java objects and the XML file which specifies the presentation of the Application data.

Yet another aspect of the invention provides a method of converting ERP data in a database managed by an ERP application and accessed through an ERP API and ERP Message Agent API (MAAPI) to strongly typed data in Java objects comprising the steps of:

(a) reading a XML file containing the definition of the Java objects and their attributes; or HyperText Markup Language (HTML) statements which specifies presentation format;

(b) parsing each of the declarations and HTML statements to identify definitions of objects and their attributes; and (c) creating the respective objects with their attributes (d) populating the objects with data from the ERP data.

Preferably in this aspect of the method of the invention the creating and populating of Java objects step comprises the steps of:

(a) opening a connection through the ERP API to the ERP Message Agent API (MAAPI);

(b) setting the Application object identifier, username and password using the MAAPI (c) setting search key values (d) instructing the ERP application to process the current object (e) for every scroll level creating a corresponding object and setting its attributes with data from the ERP Application data; and, (f) closing the connection to the ERP API.

Yet another aspect of the invention provides a method of presenting strongly typed Java objects using HTML by merging Java objects with XML template files.

The invention also provides a client server ERP information handling system, for accessing by Internet, data managed by an ERP application comprising:

a client computer accessible to a user having a web browser adapted to send information, in an Internet acceptable language, from an ERP database to a user and to send requests destined for the ERP database;

a web server for sending the panels to and receiving the requests from the client computer;

an ERP web gateway in communication with the web server for converting the requests from the web server into language format required by an interface of the ERP application and to convert information received from the interface of the ERP; and, an ERP application for controlling access to a database containing information requested by a user.

In addition another aspect of the invention provides an article of manufacture for use in a computer system comprising a computer readable medium for storing statements or instructions for use in execution in a computer in accordance with the aspects of the invention described above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

With the fast growing popularity of the Internet and the World Wide Web (also known as "WWW" or the "Web"), there is also an increasing demand for Web access to enterprise resource planning software. One aspect of the present invention implements a ERP connector that facilitates communication between Web clients, Web servers, and servers executing ERP software such as PeopleSoft's Message Agent API. The ERP Web Connector enables an application developer to build Web applications for a database management system accessed through ERP software by using HTML pages and ERP API.

An end user of these applications sees only the web pages for his/her requests and the resulting reports. Users fill out the input forms, point and click to navigate the forms, and to access the ERP software. A complete sequence of API calls is dynamically built by the ERP Web Connector with the user inputs and sent to the server executing the ERP software. The API commands are performed by the ERP software, and the resulting output is merged by the ERP Web connector into the HTML forms for presentation to the user or XML documents for consumption by another application.

An application developer, XML based definitions of the ERP API and stores them in the ERP Web connector machine. The developer then executes a command to generate Java code that invokes the API, HTML pages containing Java Server page information, and template files—i.e. XSL—that format the ERP API results. The developer can modify these generated files to customize the output web page, the API results format, or the combine the Java code together for more complicated functionality. Since the ERP Web gateway uses native Web languages, and not some new or hybrid language, various off-the-shelf tools may be used for creation of Web pages.

Hardware Environment

Figure 1:
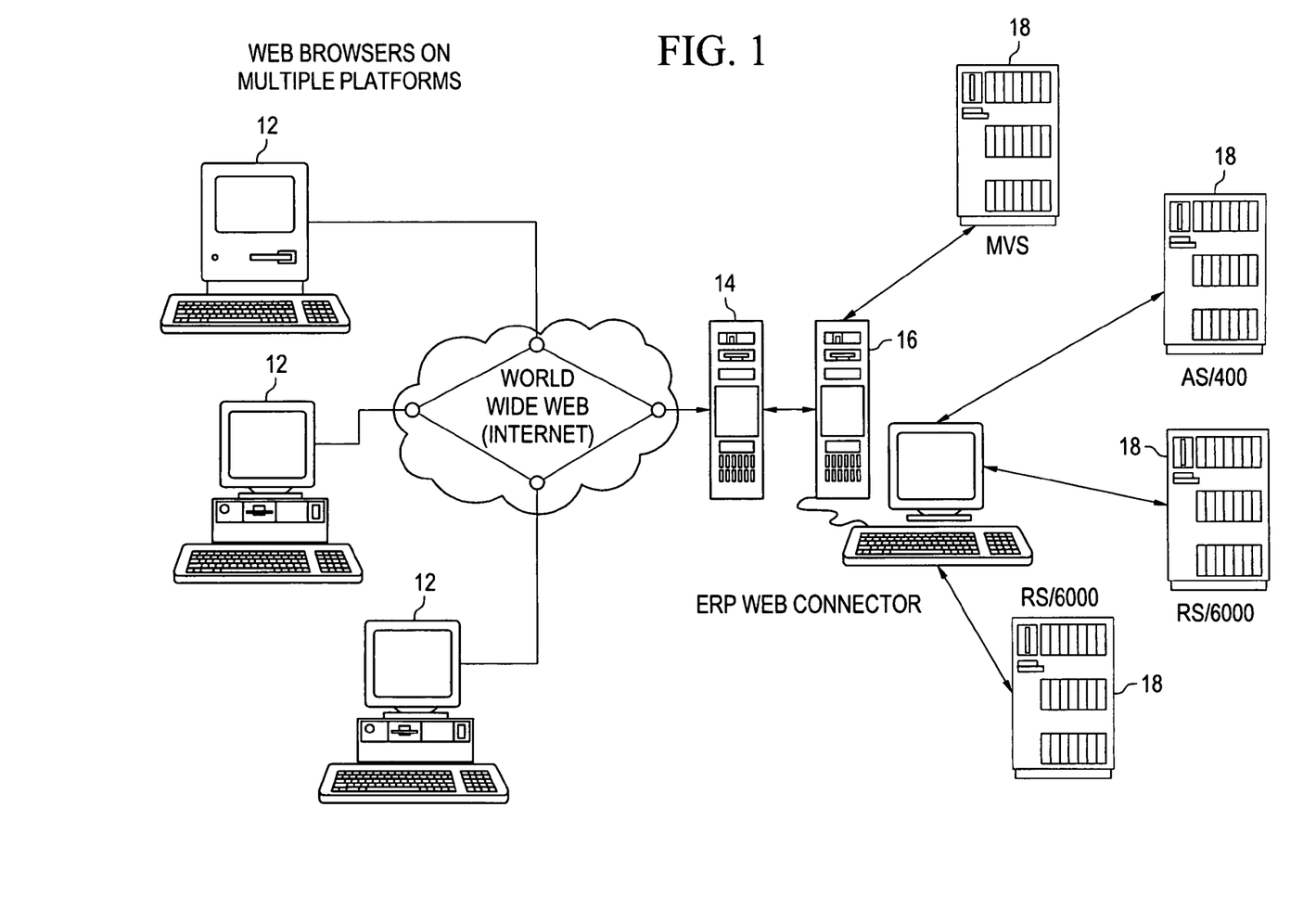
FIG. 1 schematically illustrates—the hardware environment of the preferred embodiment of the present invention.

FIG. 1 schematically illustrates the hardware environment of the preferred embodiment of the present invention, and more particularly, illustrates a typical distributed computer system using the Internet 10 to connect client systems 12 executing Web browsers to server systems 14 executing Web daemons, to connect the server systems 14 executing Web daemons to server systems 16 executing the ERP Web Connector, and to connect the server systems 16 executing ERP Web Connectors to server systems 18 executing the ERP Application. A typical combination of resources may include clients 12 that are personal computers or workstations, and servers 14, 16, and 18 that are personal computers, workstations, minicomputers, or mainframes. These systems are coupled to one another by various networks, including LANs, WANs, SNA networks, and the Internet.

A client system 12 typically executes a Web browser and is coupled to a server computer 14 executing a Web server. The Web browser is typically a program such as the IBM Web Explorer, or Netscape or the Microsoft Internet Explorer. The Web server 14 is typically a program such as the IBM HTTP Daemon or other WWW daemon. The client computer 12 is bi-directionally coupled with the server computer 14 over a line or via a wireless system. In turn, the server computer 14 is bi-directionally coupled with a ERP Web Connector (Web Gateway) 16 over a line or via a wireless system. In addition, the ERP Web Connector 16 is bi-directionally coupled with one or more ERP application servers 18 over a line or via a wireless system.

The ERP Web Connector 16 supports access to a server 18 executing ERP software. The ERP Web Connector 16 and ERP server 18 may be located on the same server as the Web server 14, or they may be located on separate machines. The servers 18 executing the ERP software may be geographically distributed and may comprise different vendor systems, such as a PeopleSoft, SAP, BAAN, etc.

Those skilled in the art will recognize many modifications may be made to this configuration without departing from the scope of the present invention. For example, in two-tier configuration, the server system executing the functions of the ERP Web Connector 16 may also execute the functions of the Web server 14 and/or the ERP server 18. Alternatively, in a three-tier configuration, the Web server 14, ERP Web Connector 16, and ERP server 18 may all be performed by different servers.

ERP Web Gateway

Figure 2:
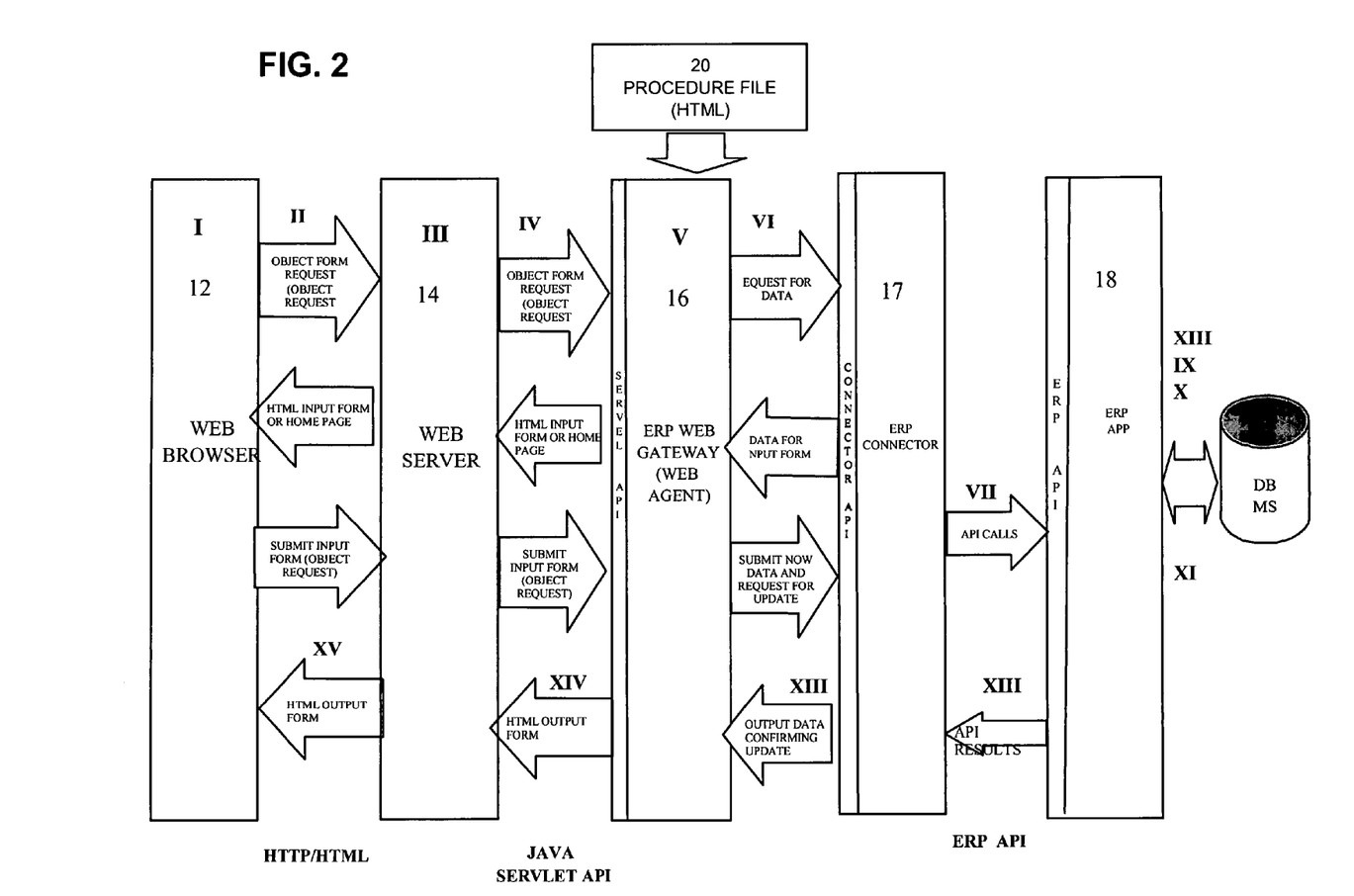
FIG. 2 shows schematically an overview of the preferred embodiment of the present invention, and in particular, shows the interaction among components in the present invention.

Referring to FIG. 2, the ERP Web Gateway 16 is designed to be sufficiently flexible and powerful, yet be available on multiple platforms, such as OS/2, AIX, MVS, etc. as long as a Java Virtual Machine is available on the platform. Further, the ERP Web Gateway 16 is designed to work with existing Web and ERP application development tools, with minimal modifications required to such tools.

These goals led also to the development of the code generation and run-time environment of the present invention. The ERP Web Gateway introduces a interface object, the ERP Connector 17, to map the procedural ERP Application native API. It also incorporates a mechanism that allows input data from an HTML-format input form to be inserted as parameters for the ERP Application. Another mechanism is incorporated to allow the ERP Application results to be merged into HTML report forms. The runtime engine of the ERP Web Gateway 16 reads the XML template files to generate the appropriate Java objects with their attributes and report forms. The use of XML instead of a new or hybrid language, allows the full expressive power without artificial limitations. Both object definitions and report forms can be laid out in any fashion as long as the specifications are conformed to the XML syntax.

Interaction Among Components

FIG. 2 shows schematically an overview of the preferred embodiment of the present invention, and in particular, shows the interaction among components in the present invention. The user interacts with the Web browser executing on a client computer 12 remotely located from the Web server 14. At some point, the user executes an HTTP command via the Web browser on client 12 that results in communication with an HTTP daemon executing on the Web server 14. The Web server 14 would then transmit an initial or home page in HTML format to the Web browser on client 12 for presentation to the user. The ERP Web Connector 16 would be invoked by the user selecting a hyperlinked item from the home page. The ERP Web Connector, 16 conforms to a web server interface, such as the Common Gateway Interface (CGI) defined for Web servers 14, or the Java Servlet API and thus can be invoked from an HTML page in one of two ways: either by an HTTP anchor reference or by an HTTP form action.

An HTTP anchor reference would typically be formatted as follows: "<A HREF=http://{web-server}/{cgi-name}[?variable-name=variable-value & ... ]>".

An HTTP form action would typically be formatted in a similar manner as follows: "<FORM METHOD={method}ACTION=http://{web-server}/{c-gi-name}[?variable-name=variable-value & ... ]>".

In both of the above examples, the following parameters are used:

"{web-server}" identifies the Web server;

"{cgi-name} " identifies the Common Gateway Interface (CGI) or Java Servlet interface to the ERP Web connector;

"{method} " is either "GET" or "POST", as specified under the HTML standard;

"[?variable-name=variable-value & ... ]" are optional parameters that may be passed to the ERP web connector program At some point in the interaction between the Web browser on client 12, the Web server 14, and the ERP Web gateway 16, a user using the Web browser on client 12 would request data from a ERP application 18 a form request (an object request) is sent 30 from the client 12 to Web Server 14, which forwards the object request to the ERP WWW gateway 16 which would retrieve any user inputs from the HTML input, retrieve any parameters specified in the web page, and retrieve data through the ERP Connector 17, from the ERP application 18, populate the set of strongly typed objects corresponding to the ERP data. The ERP Web gateway then either: 1) extracts an output template based on the web page parameters, converts the strongly typed objects to XML strongly typed objects, converts the XML objects to HTML using the output template, then transmits the HTML output page to the web server; 2) converts the strongly typed objects to XML strongly typed objects then transmits the XML outputs to the web server; 3) extracts an output template based on the web page parameters, converts the strongly typed objects to HTML using the output template, then transmits the HTML output page to the web server 14. The Web server 14 transmits the HTML input form to the Web browser 12 for display to the user.

Development Environment

Figure 3A:
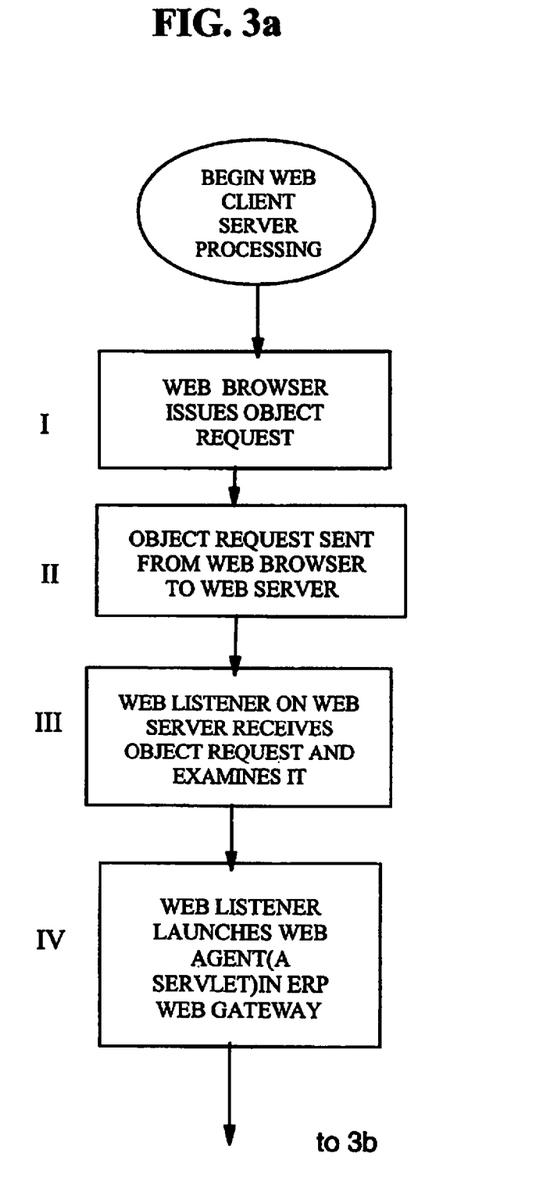
FIGS. 3A & 3B (hereinafter referred to as FIG. 3) show schematically an overview of the preferred embodiment of the present invention, and in particular, show the relationship between the user runtime environment and the application development environment of the present invention.
Figure 3B:
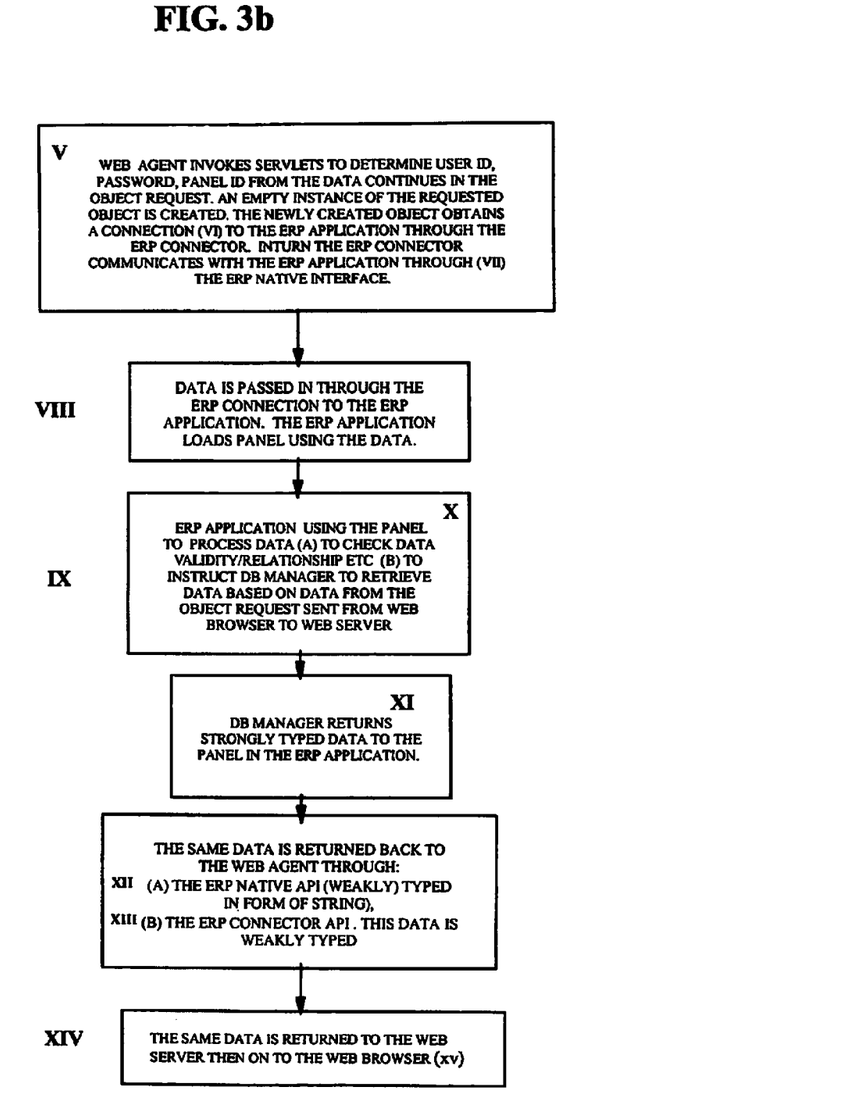

FIGS. 3A & 3B (hereinafter referred to as FIG. show schematically an overview of the preferred embodiment of the present invention, and in particular, show the relationship between the user runtime environment and the application development environment of the present invention.

As mentioned earlier, the runtime environment includes the interaction between clients executing Web browsers and Web servers, ERP Web Gateway, ERP Connector and ERP server. Access to the ERP server via the ERP Web Gateway is controlled by programming stored in strongly typed language files.

The process used in the runtime environment by the invention as shown in FIG. 3 is linked for the purpose of this explanation to the apparatus of the invention depicted in FIG.

2 by the use of Roman Numerals in both figures. Referring to FIGS. 2 and 3 the web browser on client 12 issues an object request (I). The object request is sent (II) from the web browser to the web server 14. A web listener on the web server 14 receives the object request and examines it (III). The web listener launches a web agent (a servlet) in the ERP Web Gateway 16 (IV). The web agent invokes servlets to determine user ID, password, panel ID from the data contained in the object request, and an empty instance of the requested object is created (V). The newly created object obtains a connection to the ERP application through the ERP Connector 17 (VI). In turn the ERP Connector 17 communicates with the ERP application through the ERP Native Interface (VII). (VIII) Data is passed in through the ERP Connector to the ERP application. The ERP application loads a panel using the data. (IX) The ERP application uses the panel to process data (a) to check data validity/relationship etc., and (b) to instruct the database manager to retrieve data based on data from the object request sent from the web browser to the web server. (XI) The database manager returns strongly typed data to the panel in the ERP application. The same data is returned back to the web agent through: (a) (XII) the ERP native API (weakly typed in the form of a string); and (b) (XIII) the ERP Connector API. The same data is returned to the web server (XIV) and then on to the web browser (XV).

According to the present invention, the development of Web applications for accessing relational databases may typically involve the following steps:

1. Create an ERP data definition that maps ERP data to strongly typed objects
2. Execute Code generation that extracts the ERP data definition and generates
   a) Strongly typed program files;
   b) Template output file;
   c) HTML page containing commands to execute program files;
3. Optionally edit the template output file for a different ERP data output format.
4. Optionally edit the HTML page to either change the non ERP data in the web page or to change the sequence of access to the strongly typed objects.
5. Optionally edit the auto-generated or any human generated strongly typed language files.
6. Compile the strongly typed language files.
7. Install the template output file, HTML page and strongly typed language files in the ERP Web gateway.

The key challenge in writing applications for the ERP Web Gateway is to understand HTML, the ERP application, and the output template languages, since these languages are all involved in the ERP Web connector. In its simplest forms, basic knowledge of the ERP application and HTML can be easily acquired. However, these languages can be quite complex and tedious to write in order to utilize their advanced functions.

Fortunately, there are existing HTML editors that can help to greatly reduce the complexity of writing the HTML files. For example, NetObjects Fusion and Microsoft FrontPage provide user friendly environment to develop HTML files.

ERP Data Definitions (Data Access Code Generation) Overview

Data access code generation to provide ERP Data Definitions is a process whereby a data object can be described using XML, and processed during build time to create the necessary Java classes, which provide access to the data in a database, the access to which is controlled by an ERP application at run-time. The advantages that this process has relative to the manual creation of the code include:

Simpler, straightforward set of XML elements can be used to describe the database (backend) attributes and the mapping to Java objects.

More maintainable and consistent generation of code, which is especially useful when there are several data objects to manage Faster generation of data objects Allows optimization of the code in the future, for example, lazy initialization Allows retargeting objects for a different database or application Users do not need to have knowledge of proprietary backend APIs Allows generation of test suites The overall data access code generation process is as follows:

1. Create an XML file describing the data object
2. Run a GenerateCode utility against the XML file created in the preceding step. The GenerateCode utility preferably applies code generation templates.

Data Object Description in XML

Figure 4:
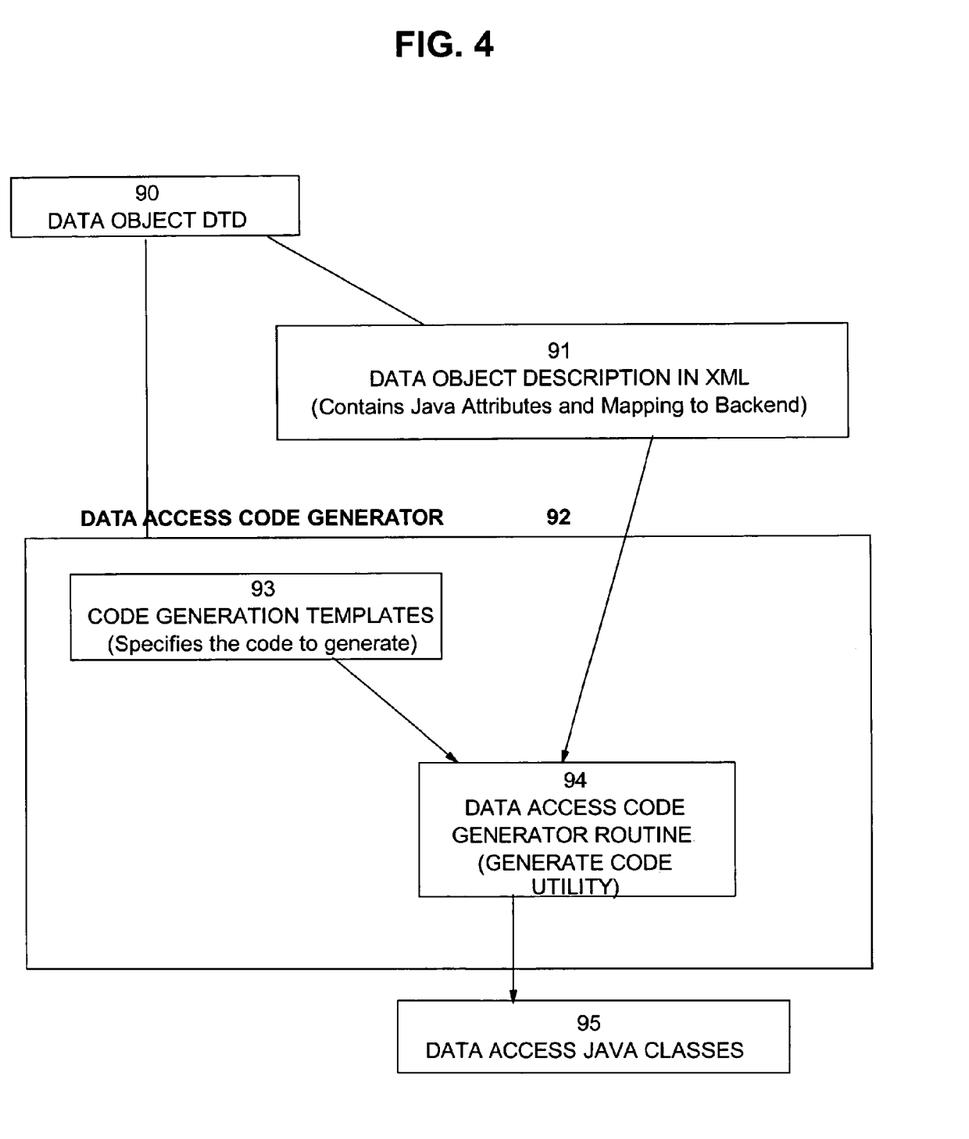
FIG. 4 is a flowchart illustrating the steps involved in creating an ERP data definition used as data access code to access data in a database accessed by ERP API's.

FIG. 4 shows the steps involved in using the code generator 92 to generate data access code 95. First the author must use the data model that exists in the backend to create the data object description XML document 91. All data object description documents must conform to a single DTD 90 which the Data Access Code Generator supports. The elements and attributes defined in the DTD 90 depend on the backend access APIs. For example, a system that accesses a relational database backend will contain attributes and elements for the columns names and the mapping of the columns to Java attributes.

A sample data object description XML for the Career object that retrieves data from the ps_acad_car_vw database table follows:

Career.xml—Sample data object description in XML

```
1<?xml version="1.0"?>
<!DOCTYPE DOlist SYSTEM "DataObjectDescription.dtd">
<!-- Career represents an academic career offered by an institution.
     It corresponds to a row in the ACAD_CAREER table.
     Career aggregates terms.
-->
<DataObject name="Career" package="com.ibm.pdc.common">
    <!-- Primary Key Attributes of the Career -->
    <property name="institution" key="true"/>
    <property name="code" key="true"/>
    <!-- Attributes -->
    <property name="description"/>
    <property name="gradingScheme"/>
    <!-- Mapping of Java attributes to database column names -->
    <DatabaseAttributes table="ps_acad_car_vw">
    <!-- keys -->
    <input property="institution" identifier="INSTITUTION"/>
    <input property="code" identifier="ACAD_CAREER"/>
    <!-- data -->
    <output property="description" identifier="DESCR"/>
    <output property="gradingScheme"
        dentifier="GRADING_SCHEME"/>
    </DatabaseAttributes>
    <!-- References -->
    <ReferenceAttributes name="terms" type="Term" array="true">
    <!-- Key specification -->
    <key name="institution" value="institution"/>
    <key name="careerCode" value="code"/>
    </ReferenceAttributes>
</DataObject
```

The property elements specify the attributes of the Java class. The key attribute of the property element defines whether the property is a key. If an attribute is a key, the value of the attribute cannot be altered after the object is created. Key attributes are used to uniquely identify an object; the properties with key="true" together form the primary key.

The DatabaseAttributes element contains the mapping of the Java attributes to the database column names. For each input and output tag within the DatabaseAttributes element, the author specifies the property and the identifier attributes. property contains the Java attribute name and identifier contains the backend identifier (a database column name in this example).

The ReferenceAttributes element describes an association relationship, which is implemented as a Java reference. For example, the ReferenceAttributes element is used to represent a foreign key relationship in a relational database. The elements within a ReferenceAttributes element contain the mapping of the attributes in the current object to the key (primary key or search key) attributes in the referenced object. ReferenceAttributes elements in the data object description are used to express a directed, labeled graph of objects, where each ReferenceAttribute element is a vector in the graph.

Data Object Data Type Definition (DTD) for data object description in XML

```
<!--
* DataObject.dtd is the DTD that all data object description files
must implement.
* ERP element - Element describing access to ERP panel
* DatabaseAttributes - Element describing access to database table
-->
<!ELEMENT DataObject (property?, ERPAttributes?,DatabaseAttributes?,
ReferenceAttributes?)*>
<!ATTLIST DataObject name CDATA #REQUIRED>
<!ATTLIST DataObject package CDATA #REQUIRED>
<!ELEMENT property EMPTY>
<!ATTLIST property name CDATA #REQUIRED>
<!ATTLIST property type CDATA #IMPLIED>
<!ATTLIST property key CDATA #IMPLIED>
<!ELEMENT ERPAttributes (input*,output*, subPanel*>>
    <!ATTLIST ERPAttributes panelName CDATA #REQUIRED>
<!ELEMENT subPanel (input*, output*>>
<!ELEMENT DatabaseAttributes (input*,output*>>
<!ATTLIST DatabaseAttributes table CDATA #REQUIRED>
<!ELEMENT input EMPTY>
<!ATTLIST input property CDATA #REQUIRED>
<!ATTLIST input identifier CDATA #REQUIRED>
<!ELEMENT output EMPTY>
<!ATTLIST output property CDATA #REQUIRED>
<!ATTLIST output identifier CDATA #REQUIRED>
<!ELEMENT ReferenceAttributes (key*)>
<!ATTLIST ReferenceAttributes name CDATA #REQUIRED>
<!ATTLIST ReferenceAttributes type CDATA #REQUIRED>
<!ATTLIST ReferenceAttributes array CDATA #IMPLIED>
<!ELEMENT key EMPTY>
<!ATTLIST key name CDATA #REQUIRED>
<!ATTLIST key value CDATA #REQUIRED>
```

The above listing contains the DTD for the data object description shown in the Career.xml. In addition to DatabaseAttributes for accessing database attributes, the DTD also allows ERP Attributes for describing the access to ERP panels. ERP Attributes can contain an additional element called subPanel which is used to retrieve the attributes in a nested panel.

The Career object in the previous example can be retargeted to serialize information to/from ERP instead of the database by simply modifying the Career.xml data object description file. The DatabaseAttributes element will be replaced with an ERP Attributes element. Once Career.xml has been updated with the ERP Attributes element, rerunning the code generator routine will produce code that uses the ERP API to serialize the object instead of using JDBC to serialize to the database.

Code Generation Templates

The code generation templates 93 in FIG. 4 describe the code that is generated when the code generation routine 94 is invoked. The code generation routine 94 takes the code generation template 93 and the data object description XML 91 as inputs and produces Java source code 95. The code generation template contains the following:

API calls for the backends that are supported in the DataObject.dtd. For the example in FIG. 2, the code generation template will contain support for ERP API calls for accessing ERP and JDBC API calls for accessing relational databases.

Implementation of system-wide policies such as caching, lazy initialization, logging and use of system infrastructure.

Rules for code generation. For example, if a property is defined as a key, then only the getter method for the attributes is generated.

Describing a Sub-Graph of Data Objects for Improved Performance

The ReferenceAttribute elements can be used to describe a directed, labeled graph. Each data object description XML document is a node and the ReferenceAttribute elements are vectors of the graph. Each generated data object class typically performs lazy initialization. This approach is more efficient than populating the entire graph of objects, but it can result in several backend accesses.

Figure 9:
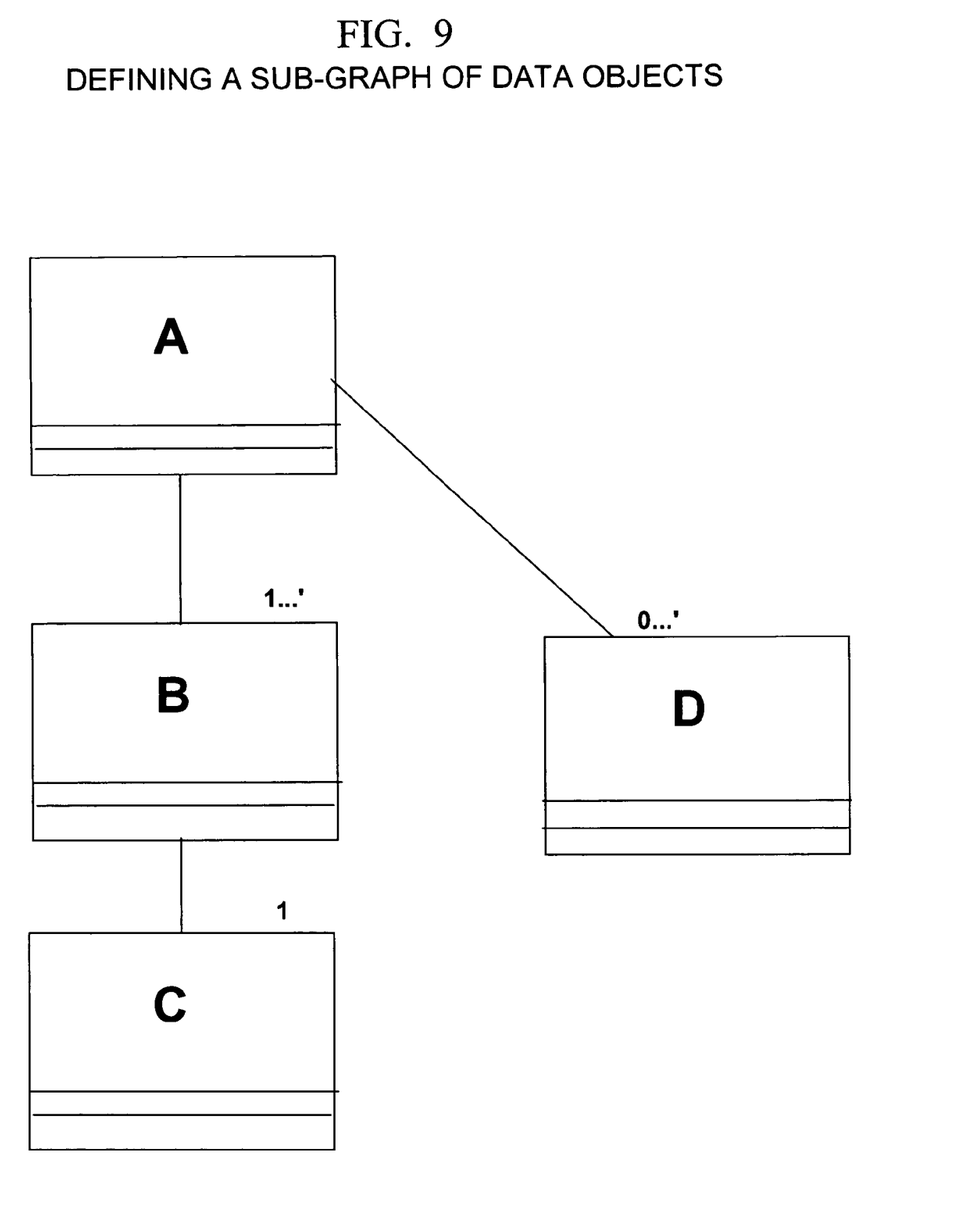

For the object model in FIG. 9, assume that data objects A, B and C need to be retrieved. The number of queries to retrieve data objects A, B and C using lazy initialization is as follows:

| | Number of queries to retrieve objects | Number of objects returned |
|---|---|---|
| A | 1 (find by primary key) | A |
| B | A | B |
| C | Ab | C |

In general,

Number of backend accesses to retrieve object hierarchy (A->B->C . . . )=1+a+ab+abc . . .

where a, b, and c are the number of objects of class A, B, and C, respectively.

Therefore, the number of queries to retrieve an object hierarchy is proportional to the number of objects when lazy initialization is used.

In situations where there is considerable overhead for each access to the backend and the backend is efficient at performing joins, the overall systems performance can be improved by performing a single query that retrieves all the objects in the sub-graph of interest.

Sample Sub-Graph Description in XML

```
<DataObjectTree name="CurrentEnrollmentsView">
    <rootnode name="dataObjectA" dataobject="A">
    <reference name="dataObjectB" dataobject="B">
    <reference name="dataObjectC" dataobject="C"/>
        </reference>
    </rootnode>
</DataObjectTree>
```

The sub-graph of the data model is described in an XML document, like the one shown above. The example describes a sub-graph for the CurrentEnrollmentsView business function that will retrieve data objects A, B and C using a single query. The example assumes that ReferenceAttribute elements from A to B and from B to C exist in the data object description XML documents for A and B respectively. Notice that data object D is not retrieved as part of this sub-graph.

The DataObjectTree element identifies the business function that this sub-graph or view of the model is for. Each rootnode element identifies a starting point of traversal of the object model. The rootnode elements contain reference elements to indicate that automatic pre-fetching of that reference is required. For example, <reference name="dataObjectB" dataObject="B">, specifies that the reference from data object A to B should be retrieved as part of the single query. reference elements may be nested.

Using a code generation template that handles DataObjectTree documents, Java code can be generated to perform a single, large query that retrieves data objects A, B and C. The template will use the ReferenceAttribute element from A.xml, B.xml and C.xml to generate the correct join attributes for the single query.

The description of the data object in XML makes it possible to perform enhancements such as the use of sub-graphs for backend access optimization.

Using XML to describe data objects has several advantages. The users of the Data Access Code Generator need not learn the proprietary backend APIs, since the proprietary calls are contained only within the code generation template. The users of the code generator are then able to focus on leveraging their knowledge of the backend data model to create data access objects more efficiently. System-wide changes and enhancements can be made as part of a new build by regenerating the data objects using a modified code generation template or data object description. Using XML to describe the data object allows validation against the data object DTD to catch errors early in the development.

Conversion from ERP API to Strongly Typed Objects

Figure 5:
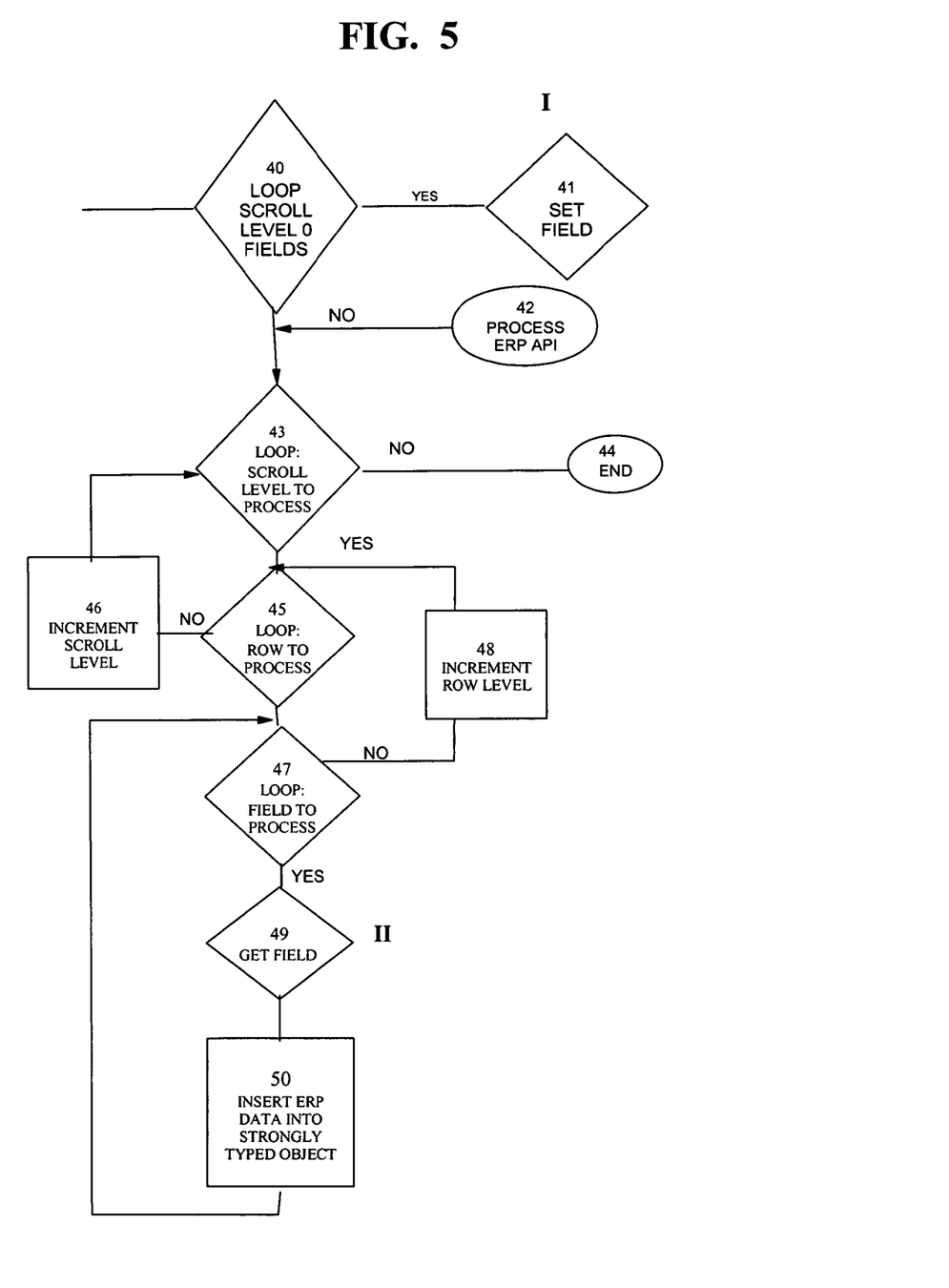
FIG. 5 is a flowchart illustrating the steps involved in populating strongly typed objects that correspond to a weakly typed ERP object.
Figure 6:
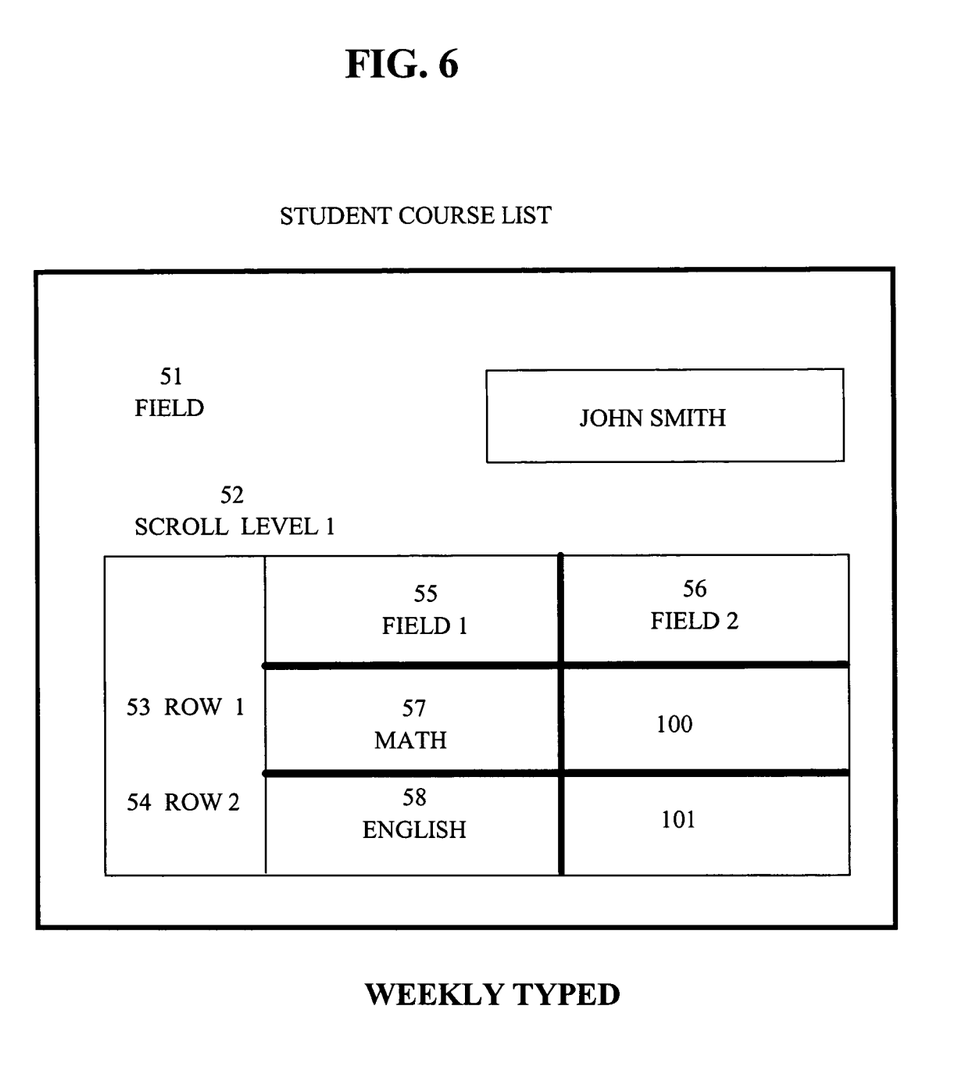
FIG. 6 shows a student course list panel and the fields associate with the panel.

FIG. 5. is a flowchart illustrating the steps involved in invoking the ERP API and merging the results of that invocation into a strongly typed object. An example is the PeopleSoft Message Agent API (MAAPI). The MAAPI provides an API to access weakly typed PeopleSoft application data. The API provides methods for: specifying the panel to access, i.e. the CourseList panel; specifying the username and password for logging into the PeopleSoft application; methods for setting field values, i.e. setField (I); and methods for getting field values; i.e. getField (II). An example panel is the access to a list of courses that a student is taking (See FIG. 6.). The student name and the term for the courses are known as search keys. There are many courses that may match a particular student name and term, so a course list object contains 1 student name, 1 term, and a list of courses. Each course may have multiple fields, such as course name and course number. The student and term are search keys located scroll level 0, and the list of courses are data found in scroll level 1. The list of courses has as many rows as there are courses. In other panels, there may be more than 2 levels of data.

Figure 7:
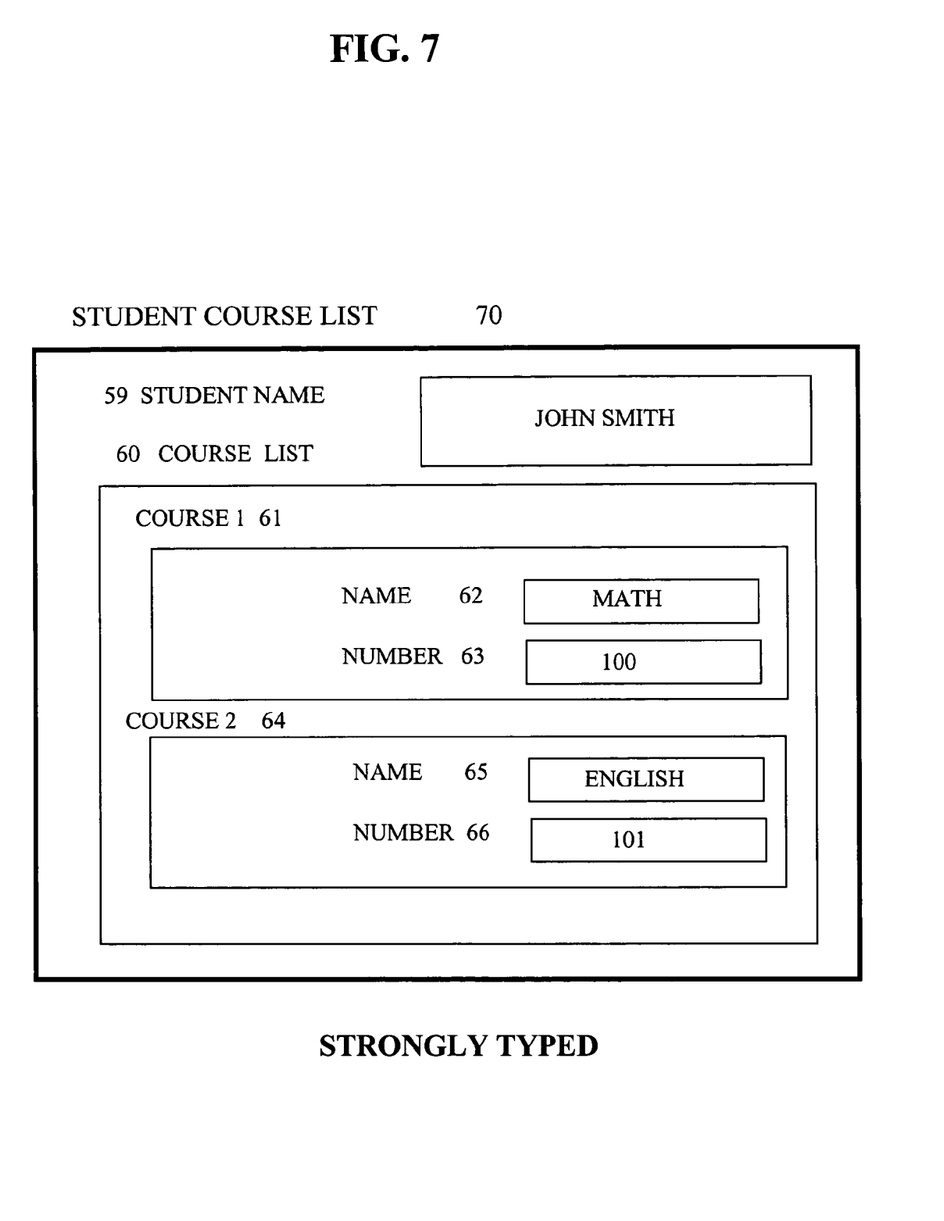
FIG. 7 shows a strongly typed Student Course List Java Object.

The ERP API exposes the courses, student and term as fields. All the fields are returned in character type through the PS API. The API generalizes all Application data to fields with character values; hence losing the original context of the fields. This is known as weakly typed. It is often desirable to have the courses, student and term fields represented as courses, student and term respectively. In the Java programming language, this would involve the creation of a Java class called a studentCourseList 70 (see FIG. 15 7.), that contains a student name 59, and a list 60 of course objects. The course objects are instances of the Java class called course. Thus the objects are referred to as studentCourseList and courses, rather than fields, etc. This is known as strongly typed.

The algorithm for converting the weakly typed ERP Application data to strongly typed programming languages objects is:

1. Open a connection to the ERP API through the ERP Connector (description of the ERP Connector is included in the next section)
2. Set the Application object identifier, username and password using ERP Connector
3. Set any search key values (I)
4. Instruct the PeopleSoft application to process the current object
5. For every scroll level (level 0 and 1 in the example): (II)
    5.1. Create object for the scroll level
    5.1. for each row in the scroll level
    5.1.1 if scroll level >0 then create new object in list
    5.1.2 for each field in the row
    5.1.2.1. get the field value (scroll level, row #, field #)
    5.1.2.2. Set the strongly typed object value to field value
    For example, if scroll level 0 and row level 0 and field 0 then set studentcourselist objects name attribute to field value
6. Close the connection to the ERP API through ERP Connector ERP Connector (ERPC)

The ERP Connector insulates applications from the details of the underlying ERP applications. The ERP Connector API (ERP API), through which the ERP Connector is accessed, exposes objects that provide the ERP content and functionality required by the client Java objects. These connector objects will change only if there are significant semantic changes to the ERP system.

The ERP Connector is implemented as two distinct layers: the Application Connector and the Data Connector. The Application Connector implements the logical mapping of object data and behavior onto corresponding ERP application features. The Data Connector implements physical communication with the ERP system. The motivation for the separation of the Data and Application layers is the structure of a ERP system. The Data Connector is tightly coupled to a particular version of the ERP run-time environment and independent of the specific application being run. The Application Connector on the other hand, is tightly coupled to the underlying ERP application.

The ERP Connector provides the single point of access to the ERP application functionality. It does not extend the functionality of the ERP system. The Connector has detailed knowledge of the nature, purpose, and meaning of individual panels and data items, as well as of the business logic that applies to them. The Connector also knows the configuration of the underlying ERP system and how best to access specific items. The current interface is through the ERP API.

The ERP Connector will support multiple concurrent client requests through multi-threading. Clients connect to the Connector and make object requests using Connector API methods. There are no restrictions on the number of connections by a client, nor on the number of requests performed by a single connection. The Connector may limit the number of concurrent clients or requests by queuing new requests. During a connection, clients must specify the ERP identity that will be used to perform the requests. ERP uses this identity to control access to panels and database fields.

ERP Connector API

The ERP Connector APT is implemented by the Application Connector. The API provides both connection and application objects. Connection objects provide methods for establishing a connection and requesting specific application objects. Application objects provide specific functionality. Application objects may aggregate other application objects, and may be collections, with the caveat that updates that involve multiple panels may not execute atomically. The full API is not specified at this time because it depends on requirements and restrictions that are to be identified during product development.

Basic application objects consist of attributes that correspond to data values, and methods that correspond to actions that apply to the object. The methods a particular application object provides will vary, but certain ones are likely to be standard. These include the Get(field) method which populates the object attributes from the ERP application for a particular instance as specified by a set of key values passed to Get(field) as parameters. The complementary Set(field) method persists the current attribute values to the ERP backend. Other standard methods include Add( ), Delete( ), and VerifyValues( ). The later method verifies the acceptability of the current attributes against the edit checks and business logic defined for this object in the backend, but does not persist the values. In addition to the standard set, a particular object may have any number of specific methods that correspond to special behavior for that object.

Although the Connector APT is described as a local Java object, performance consideration may require that the Connector exists on a remote computer. In this case, the API may be modified for remote invocation through a mechanism such as Java RMI or CORBA.

The Connector APT is a synchronous interface with no callbacks or events. This reflects the functionality of the API.

An outline of the ERP Connector APT is shown below:

```
package com.ibm.studentserver.ERP.connector;
static class ERPConnector // Singleton
{
    ERPConnection Connect( String operatorID; String password)
        throws ConnectException;
}
class ERPConnection
{
    private final String operatorID;
    private final String password;
    void Disconnect( );
    // other methods
}
II Application classes
class CourseDescription
{
    // Attributes
    String courseId;
    String name;
    String description;
    // Methods
    static CourseDescription Get( String courseId ) throws ... { };
    void Se( )throws { };
    void Add( String courseId )throws ... { };
    void Delet( )throws ... { };
    ...
}
```

ERP Data Connector API

The Data Connector interface is based on the concept of a message definition, which is a named specification of a ERP panel and the mapping of data fields to panel fields. The Data Connector provides a Connection object that establishes an authenticated connection with the ERP system. Through a Connection object, the client obtains Message objects that provide methods for manipulating the panel contents. An outline of the Connector follows:

```
Package com.ibm.studentserver.ERP.MAConnector;
static class MAConnector // Singleton
{
    MAConnection connect( String operatorID; String password)
        throws ConnectException;
}
class MAConnection
{
    private final String operatorID;
    private final String password;
    disconnect( ) { };
    Message startMessage( String name) { };
}
class Message
{
    processMessage( ) { };
    II Meta information
    getFieldCoun( ) { };
    getFieldLis( ) { };
    // Input
    s=SetField( String name, String value) { };
    // Output
    findFirstFiel( ) { };
    // Others
}
```

ERP Message Agent Background:

The ERP Message Agent is the designated method by which external applications can get information in and out of an ERP application. The Message Agent API enables external programs to operate ERP panels programmatically. The program can read and set the values of all panel controls including multi-level scrollbars, as well as "press" buttons on the panels. The panel is not aware that a program is operating on it; thus, it performs all regular actions: checking security, executing PeopleCode attached to record fields, workflow actions.

The Message Agent API consists of about fifty C language functions and several supporting libraries that can be invoked using the Java Native Interface (JNI). Before a panel can be used by the message agent, a named "message definition" must be created using appropriate tools available for the ERP. The message definition specifies the panel name, action mode, search record definition, and panel field-mapping through which the program gets at the panel data. The API provides functions to:

Establish and end a session, which may process multiple messages

Set the operator id to be used for the session

Deal with search dialogs

Report errors

Access all the types of data fields on a form.

Converting Strongly Typed Object Language to Strongly Typed Declarative Language The strongly typed object language is converted to a strongly typed declarative language by looping over the contents of the strongly typed object and creating a declarative object for each object value.

Using the previous example of the studentCourseList, a sample XML output is:

```
<StudentCourseList>
    <StudentName>John Smith</StudentName>
    <CourseList>
        <Course><Name>Math</Name><Number>100-
        </Number></Course>
        <Course><Name>English</Name><Number>101-
        </Number></Course>
    </CourseList>
</StudentCourseList>
```

To take advantage of the emerging XML tools, it is necessary to describe the ERP data in XML. Describing ERP data in XML provides an industry standard interface for accessing ERP functions without requiring modification to the ERP database.

The XML data file for ERP Message Agent results is created by converting the Message Agent C output into XML text data. The first step is to call the C API for each Message Agent row result, and store the values into a structure. Then the structure results are converted to a well-formed XML stream.

A sample of this is a ERP Course List panel. It produces a tabular column of courses, consisting of course name, and other course information.

The Message Agent C API is called to retrieve the course rows from the panel and store them into a structure. A sample of the structures in Java is:

```
public class Course
{
    private String name;
    private String number;
public String getName( )
    {
        return name;
    }
    public void setName(String theName)
    {
        name = theName;
    }
    public String getNumber( )
    {
    }
        return number;
    }
    public void setNumber(String aNumber)
    {
        number = aNumber;
    }
}
// StudentCourseList is a Java object representing ERP panel
public class StudentCourseList
{
    // courseList is a collection of courses
    private java.Collections.List courseList;
    private String studentName;
    public String getStudentName( )
    {
        return studentName;
    }
    public void setStudentName(String aStudentName)
    {
        studentName = aStudentName;
    }
    public java.Collections.List getCourseList ( )
    {
        return courseList( )
    }
    // build a course list of course object
    .......
    .......
}
```

The Java objects are serialized into XML using a serialization routine. No matter the specific mechanism, the approach is that each item in the list is serialized as an XML fragment. Each XML fragment contains an XML element corresponding to the properties of the object, which are the elements (i.e. text field, radio button field, Y/N field etc.) on the ERP Panel.

The output of the serialization is a list of Courses, for example:

```
<StudentCourseList>
    <StudentName>StudentName</StudentName>
    <Course>
        <Name>Course#1</Name>
        <Number>Number#1</Number>
    </Course>
    <Course>...</Course>
</StudentCourseList>
```

The XML returned from two or more panel objects can be merged to create a unified view of the data in ERP. For example, as supplied by ERP, information about the meeting time and name of the instructor of a course are provided on different panels. The XML streams from the two panels can be merged to present all the information about a course on a single web page.

Sending ERP API Data to Web Clients

Figure 8:
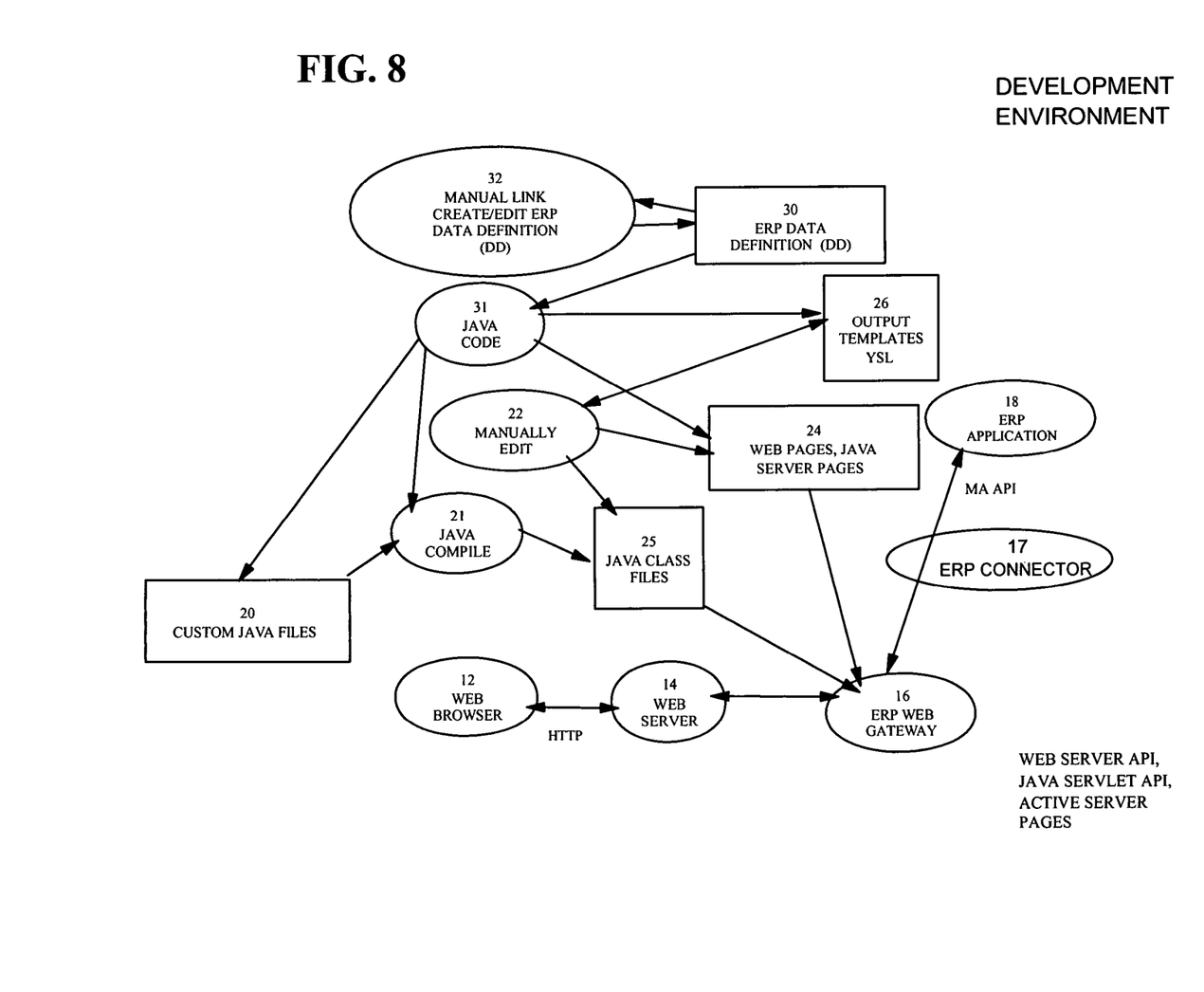
FIG. 8 is a flowchart illustrating the steps involved in invoking strongly typed objects, and converting strongly typed objects into a format requested by a web client; and, FIG. 9 depicts the defining of a sub-graph of data objects.

FIG. 8. is a flowchart illustrating the steps involved in invoking the strongly typed objects, and converting the strongly typed objects into a format requested by the web client.

1. Browser issues HTTP request.
2. Web server receives HTTP request.
3. Web server determines that ERP Web Gateway instance needed.
4. Web server creates ERP Web Gateway instance.
5. ERP Web Gateway receives parameters from HTTP request and HTML page containing reference to ERP Web Gateway.
6. ERP Web Gateway creates strongly typed objects using the Java class corresponding to requested ERP application object data.
7. ERP Web Gateway obtains data from the ERP Application through the ERP Connector.
8. ERP Web Gateway determines requested output format from parameters.
9. ERP Web Gateway formats strongly typed object to: XSL
9.1 If XSL
9.1.1 Read XSL template
9.1.2 Convert strongly typed objects to strongly typed declarative language (XML)
9.1.3 Apply XSL template to declarative language objects
9.2 if Strongly Typed Object template
9.2.1 Read Strongly typed object template
9.2.2 Apply template that converts strongly typed object language to HTML XML
9.3 If XML
9.3.1 Convert strongly typed objects to strongly typed declarative language object
10. ERP Web gateway returns ERP data in requested output format to Web server
11. Web server returns data to Web browser Conclusion This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the HTTP protocol or the HTML or ERP Application that exposes a set of external API could benefit from the present invention.

In summary, the present invention discloses a method and apparatus for accessing and updating ERP Application data via the World Wide Web of the Internet. In accordance with the present invention, Web users can request information from ERP Applications via HTML input forms, which request is then used to interact with the ERP Application. The results output by the ERP Application are themselves transformed into HTML format for presentation to the Web user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method of converting Enterprise Resource Planning (ERP) data in a database managed by an ERP application and accessed through an ERP application programming interface (API) and ERP Message Agent API (MAAPI) to strongly typed data in a Java object comprising the steps of:
    reading an eXtensible Markup Language (XML) file containing a definition of said Java object and attributes of the Java object and also a mapping of the attributes of the Java object to column names of the database;
    parsing said XML file to identify the definition and the attributes of the Java object;
    reading a template describing a backend of the ERP API, an implementation of system-wide policies, and also rules for code generation;
    creating the Java object based upon the template and the XML file containing the definition of said Java object and the attributes of the Java object and also the mapping of the attributes of the Java object to the column names of the database; and
    populating said Java object with data from said ERP data.

2. The method of claim 1, further comprising
    reading a HyperText Markup Language (HTML) statement specifying a presentation format;
    parsing said HTML statement to identify the presentation format; and
    transforming the strongly typed data in the Java object using the presentation format.

3. The method of claim 1, wherein
    the Java object is a strongly typed, and
    the ERP data is weakly typed.

4. The method of claim 1, wherein
    the data with which the Java object is populated is at least a portion of the ERP data.

5. An article of manufacture comprising a non-transitory computer readable storage medium having stored therein computer-readable program instructions for converting Enterprise Resource Planning (ERP) data in a database managed by an ERP application and accessed through an ERP application programming interface (API) and ERP Message Agent API (MAAPI) to strongly typed data in a Java object, the computer-readable program instructions, which when executed by a computer hardware system, cause the computer hardware system to perform:
    reading an eXtensible Markup Language (XML) file containing a definition of said Java object and attributes of the Java object and also a mapping of the attributes of the Java object to column names of the database;
    parsing said XML file to identify the definition and the attributes of the Java object;
    reading a template describing a backend of the ERP API, an implementation of system-wide policies, and also rules for code generation;
    creating the Java object based upon the template and the XML file containing the definition of said Java object and the attributes of the Java object and also the mapping of the attributes of the Java object to the column names of the database; and
    populating said Java object with data from said ERP data.

6. The article of manufacture of claim 5, wherein
    the computer-readable program instructions further causes the computer hardware system to perform:
    reading a HyperText Markup Language (HTML) statement specifying a presentation format;
    parsing said HTML statement to identify the presentation format; and
    transforming the strongly typed data in the Java object using the presentation format.

7. The article of manufacture of claim 5, wherein
    the Java object is a strongly typed, and
    the ERP data is weakly typed.

8. The article of manufacture of claim 5, wherein
    the data with which the Java object is populated is at least a portion of the ERP data.

* * * * *